United States Patent [19]

Shoup

[11] 4,364,581

[45] Dec. 21, 1982

[54] FOLDABLE IMPLEMENT FRAME AND HITCH

[76] Inventor: Kenneth E. Shoup, P.O. Box 121, Bonfield, Ill. 60913

[21] Appl. No.: 120,572

[22] Filed: Feb. 11, 1980

Related U.S. Application Data

[63] Continuation-in-part of Ser. No. 834,666, Sep. 19, 1977, abandoned.

[51] Int. Cl.³ .............................................. A01B 65/02
[52] U.S. Cl. ................................ 280/411 A; 172/311; 280/656
[58] Field of Search ............... 280/411 R, 411 A, 412, 280/413, 656, 638, 639; 172/311, 240, 456, 568, 581, 584, 586, 588, 662; 56/228, 385

[56] References Cited

U.S. PATENT DOCUMENTS

| | | | |
|---|---|---|---|
| 2,226,586 | 12/1940 | Seaholm | 172/240 |
| 2,706,880 | 4/1955 | Steuerwald | 172/662 X |
| 2,938,588 | 5/1960 | Stein | 172/240 |
| 3,239,274 | 3/1966 | Weiss | 280/656 X |
| 3,460,630 | 8/1969 | Richey | 172/240 |
| 3,635,495 | 1/1972 | Orendorff | 280/656 X |
| 3,791,673 | 2/1974 | Hornung | 280/411 A |
| 3,810,660 | 5/1974 | Peterson | 280/411 A |
| 4,008,833 | 2/1977 | Grandrud et al. | 172/311 X |
| 4,056,149 | 11/1977 | Honnold | 280/411 A |
| 4,066,274 | 1/1978 | Adee | 280/411 A |
| 4,073,345 | 2/1978 | Miller | 172/413 |
| 4,098,347 | 7/1978 | Honnold | 280/411 A |
| 4,117,893 | 10/1978 | Kinzenbaw | 280/656 X |
| 4,126,187 | 11/1978 | Schreiner et al. | 280/411 A |
| 4,137,852 | 2/1979 | Pratt | 280/411 A |

FOREIGN PATENT DOCUMENTS 2537391  2/1977  Fed. Rep. of Germany ...... 172/311

*Primary Examiner*—John A. Pekar
*Attorney, Agent, or Firm*—Dithmar, Stotland, Stratman & Levy

[57] ABSTRACT

A foldable implement frame and hitch for attachment to a draft vehicle with a three-point hitch, including a support frame carrying a support wheel, a support wheel motor for moving the support wheel between a working position and a transport position, a main frame having two telescoping frame members, the outer one of the frame members being supported upon the support frame and the inner one of the frame members carrying on the other end thereof a hitch for connection to the three-point hitch, two wing frames pivotally mounted on the support frame, two wing motors connected between the support frame and the wing frames for assisting in moving the wing frames between the extended working positions and retracted transport positions, two wing wheel assemblies mounted on the outer ends of the wing frames and each including a support wheel, two wing wheel lift motors mounted on the wing frame and connected to a wing support wheel for moving it between a working position and a transport position, the controls for all the motors being operable from the seat of the draft vehicle so that the foldable implement frame and hitch can be moved between the working position and the transport position while the operator is seated on the draft vehicle.

19 Claims, 12 Drawing Figures

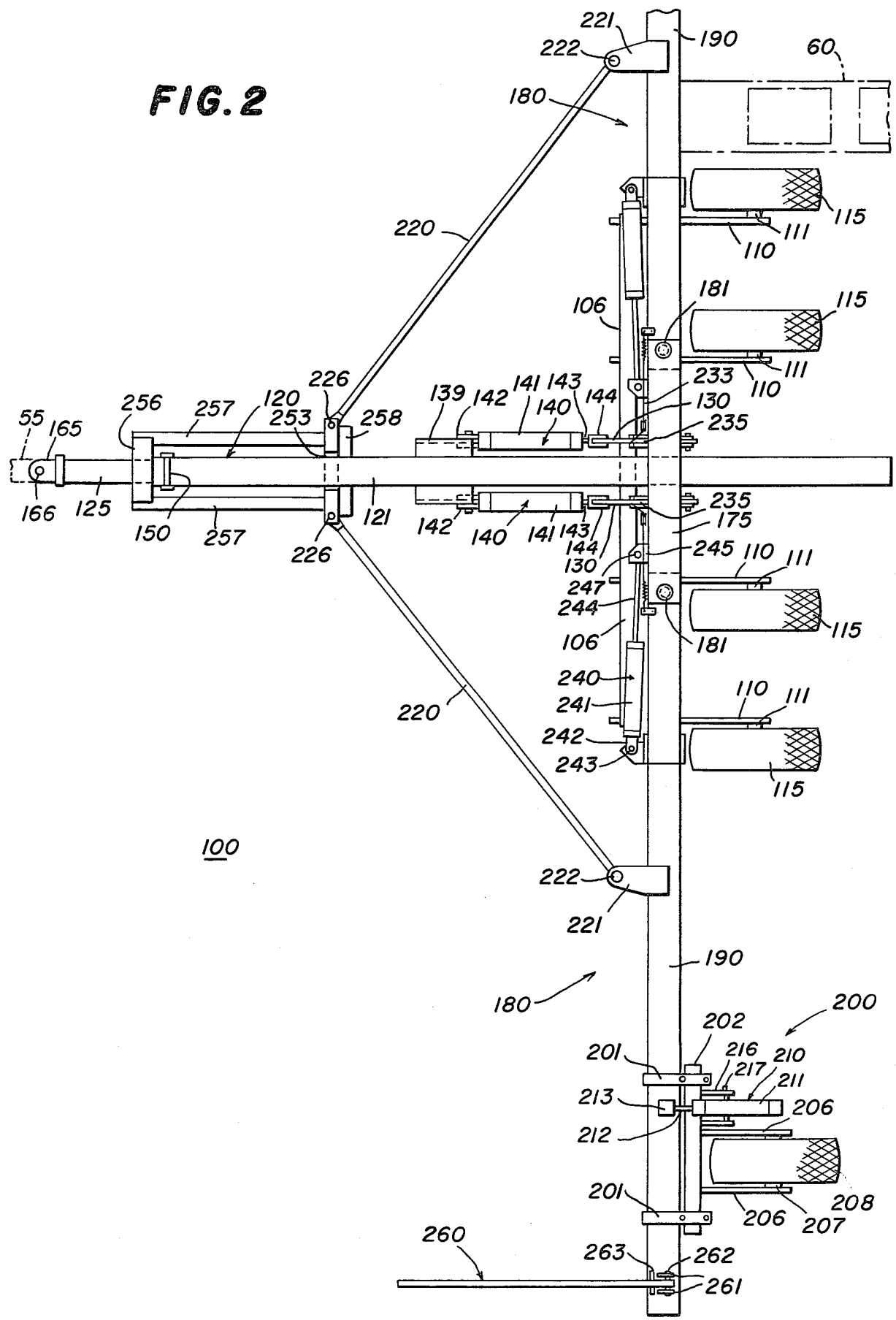

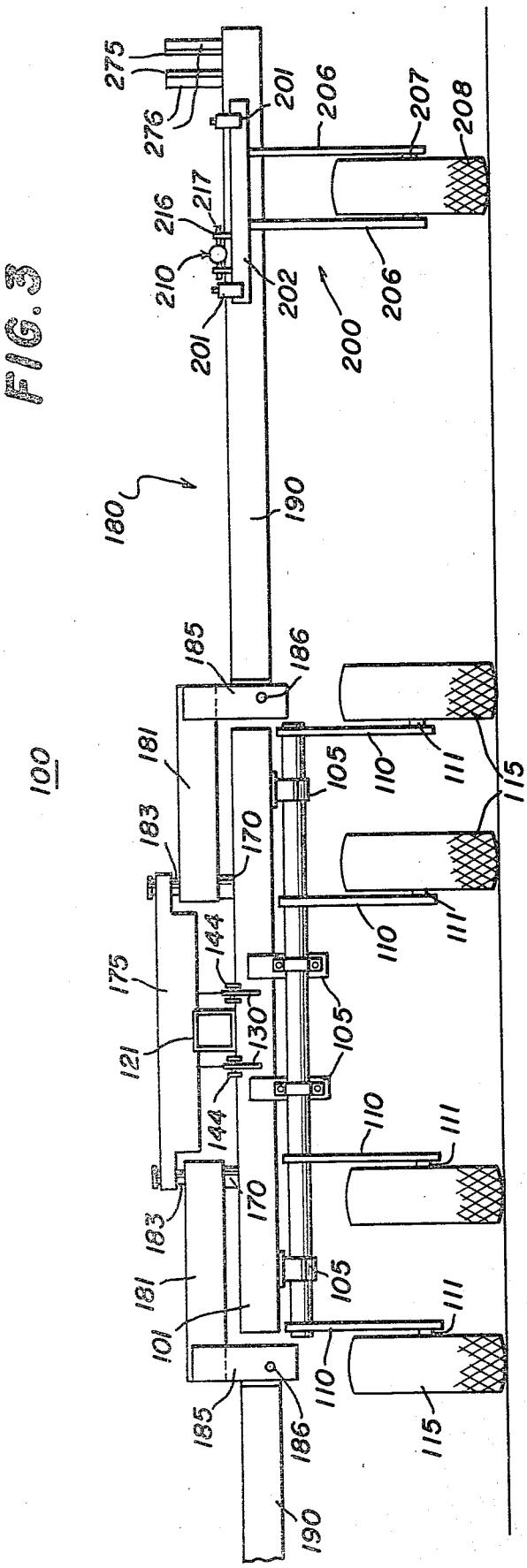

FOLDABLE IMPLEMENT FRAME AND HITCH

This application is a continuation-in-part of the copending application Ser. No. 834,666 filed Sept. 19, 1977 by Kenneth E. Shoup for Foldable Implement Frame and Hitch, now abandoned.

PRIOR ART STATEMENT AND BACKGROUND OF THE INVENTION

The present invention relates generally to improvements in foldable implement frames and hitches, and specifically to the provision of such a frame which has an unusually wide operating span and a very narrow transport span.

Implement frames and hitches are used to carry a wide variety of implements such as an air-injection planter for corn and other hard kernel grains, rotary hoes, "duck-foot" field cultivators, and the like. It is desirable that such implement frames have a wide span in the work position thereof so that a plurality of rows of crops can be simultaneously cultivated during a single pass. However, when it is time to transport the implement frame from field to field or along a highway, it is desirable that the horizontal extent of the implement frame be small so as to negotiate gates, highway lanes and the like with ease.

One form of standard practice heretofore has been to make the implement frame foldable between an extended working position and a retracted transport position with the addition of transport wheels when the parts are in the transport position. Examples of such prior implements are illustrated in the following U.S. Pat. Nos.: 2,226,586 granted Dec. 31, 1940 to J. P. Seaholm; 2,706,880 granted Apr. 26, 1955 to W. L. Steuerwald; and 2,938,588 granted May 21, 1960 to C. P. Stein. All of these prior art implement frames require the operator to leave his vehicle and manipulate the frame between the transport and working positions, all with a consequent loss of time and effort.

In another form of prior art practice, the implement frame is provided with one hitch point for the working position thereof and a second and different hitch point for the transport position thereof with the addition of the transport wheels. Such an implement is illustrated in U.S. Pat. No. 3,460,630 granted Aug. 12, 1969 to C. B. Richey. This implement frame also requires the operator to not only leave the draft vehicle to place the parts in the transport position or the work position, as the case may be, but also requires the operator to change the hitch point from that illustrated in FIG. 1 of the patent drawings to that illustrated in FIG. 2, with the subsequent movement and repositioning of the draft vehicle. All of this is time consuming as well as being wasteful of the time and energy of the operator.

In still another form of the prior art practice, foldable wings are provided which fold between a work position and a transport position. Examples of such structures are shown in U.S. Pat. No. 3,791,673 granted Feb. 12, 1974 to M. C. Hornung and U.S. Pat. No. 4,137,852 granted Feb. 6, 1979 to R. L. Pratt; a similar machine is also illustrated in West German Pat. No. 2,537,391 granted Feb. 24, 1977 to Rau. None of these prior structures show extending a telescoping main frame rearwardly of the horizontal support frame so as to provide for short coupling between the draft vehicle and the implement frame in the working positions thereof.

In yet other practices, the implement frame for transport is placed upon a trailer or other vehicle in order to facilitate easy transport thereof. Placement of the implement frame on the transport vehicle is a time consuming operation.

BRIEF SUMMARY OF THE INVENTION

The present invention provides a foldable implement frame and hitch which is capable of carrying a wide variety of implements and which can be quickly and easily moved between the working and transport positions thereof with a minimum of effort and a minimum expenditure of time. Extension of the telescoping frame members rearwardly behind the transfer support frame provides for a short coupling between the draft vehicle and the implement frame. This results in good control of the implement frame in the field, and enhances the maneuverability thereof; in addition, there is a less tendency for the implement frame to drift on a hillside.

This is accomplished in the present invention, and it is an object of the present invention to accomplish these desired results, by providing a foldable implement frame and hitch for attachment to a draft vehicle equipped with a three-point hitch comprising a support frame carrying a support wheel for supporting the support frame upon an underlying surface, a main frame including two telescoping frame members, the outer one of the frame members being supported upon the support frame and the inner one of the frame members carrying on the other end thereof a hitch for connection to the three-point hitch on a draft vehicle, and two wing frames pivotally mounted respectively on the support frame on either side of the outer frame member for movement between extended working positions and retracted transport positions, the outer one of the frame members extending a substantial distance beyond the support frame in a direction away from the hitch so that upon the telescoping of the frame members to place the wing frames in the extended working positions thereof the associated draft vehicle is disposed only a short distance from the wing frames to provide good maneuverability of the implement frame in the field.

Another object of the invention is to provide a foldable implement frame and hitch of the type set forth, and further including two braces pivotally connected respectively to the inner frame member and the associated one of the wing frames.

Yet another object of the invention is to provide a foldable implement frame and hitch of the type set forth wherein two wing wheel assemblies are respectively mounted on the wing frames adjacent to the outer ends thereof and each including a support wheel for supporting the outer end of the associated wing frame upon an underlying surface.

Still another object of the invention is to provide a foldable implement frame and hitch of the type set forth wherein the support wheels on the support frame and the support wheels on each of the wing frames are in essentially longitudinal alignment to provide a minimum turning radius for the foldable implement frame and hitch and the connected draft vehicle.

Yet another object of the invention is to provide a foldable implement frame and hitch of the type set forth provided with two wing wheel lift motors respectively mounted on the wing frames adjacent to the outer ends thereof for moving the associated support wheels with respect to the associated wing frame between its working position and its transport position.

Still another object of the invention is to provide a foldable implement frame and hitch of the type set forth wherein the telescoping longitudinal frame members have a telescoped working position placing the associated draft vehicle nearer to the support frame when the wing frames are in the extended working positions thereof, and the telescoping longitudinal frame members having an extended transport position placing the associated draft vehicle farther from the support frame to accommodate the folding of the wing frames to the retracted transport positions thereof.

Yet another object of the invention is to provide a foldable implement frame and hitch of the type set forth including lock structure engaging and holding the wing frames in the retracted transport positions thereof during transport.

Still another object of the invention is to provide on the support frame pivotally mounted support wheels movable to position the support frame between a lower working position and a higher transport position, latch mechanism being automatically engaged to hold the support frame in the higher transport position when the wing frames are folded to the transport positions thereof, and the latch mechanism automatically being unlatched to permit lowering of the support frame to the lower working position thereof upon movement of the wing frames to the extended working positions thereof.

Further features of the invention pertain to the particular arrangement of the parts of the foldable implement frame and hitch, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 2 is a plan view similar to FIG. 1, but showing the parts in the extended working positions thereof, certain parts having been broken away;

FIG. 3 is a partial rear elevational view of the foldable implement frame and hitch of FIGS. 1 and 2;

FIG. 4 is a view in longitudinal section along the line of 4—4 of FIG. 1;

DESCRIPTION OF THE PREFERRED EMBODIMENT

Figure 1:
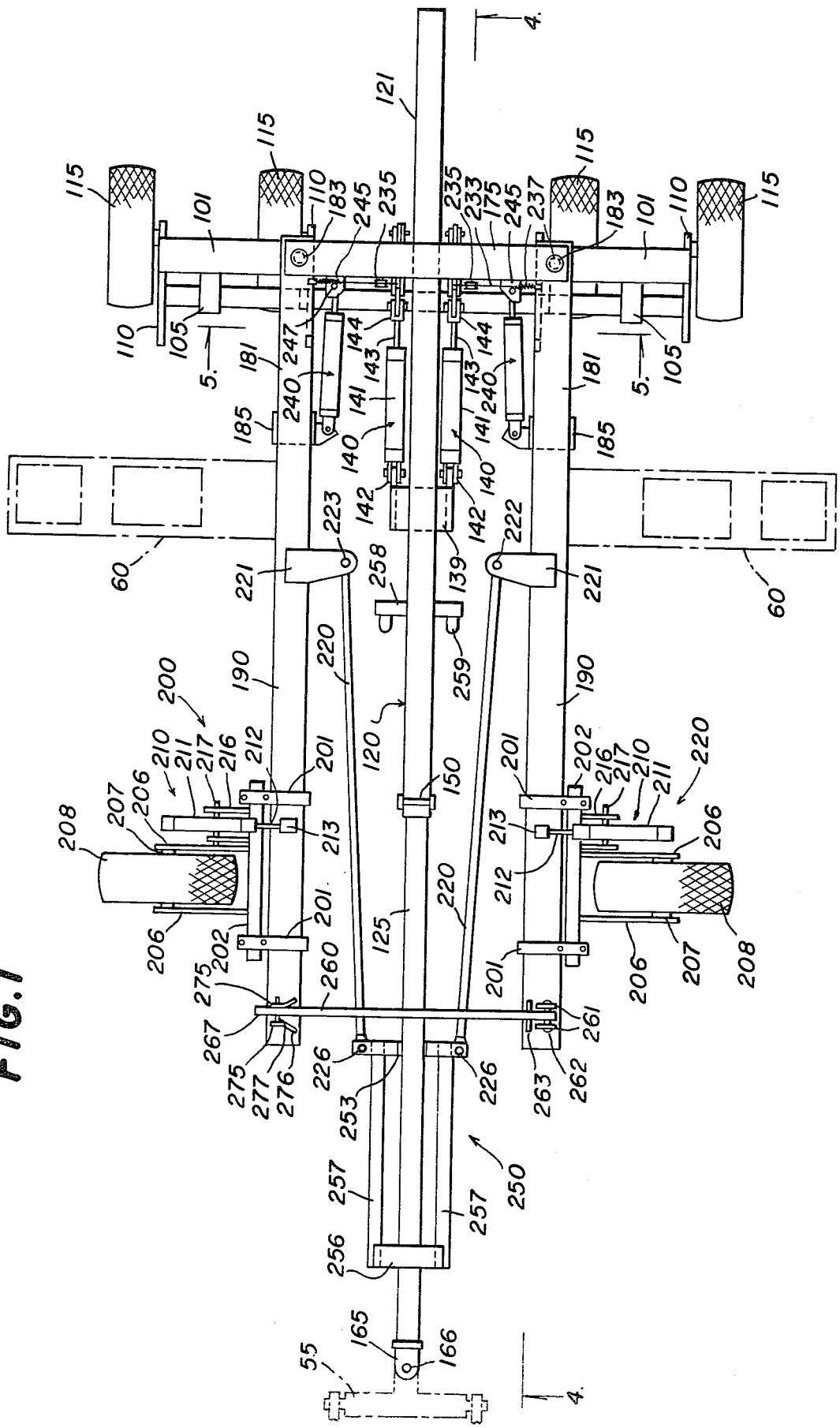
FIG. 1 is a plan view of a foldable implement frame and hitch made in accordance with and embodying the principles of the present invention, the parts of the frame and hitch being shown in the folded transport positions.

There is illustrated in FIGS. 1-4 of the drawings a foldable implement frame and hitch 100 made in accordance with and embodying the principles of the present invention, the foldable implement frame and hitch 100 including a support frame 101 carried by a plurality of wheels 115 and having fixedly connected thereto a main frame 120 having an outer longitudinal frame member 121 telescopically receiving therein an inner longitudinal frame member 125; secured to the support frame 101 are two folding wings 180 supported at the outer ends by wing wheel assemblies 200 and provided with wing braces 220.

Figure 5:
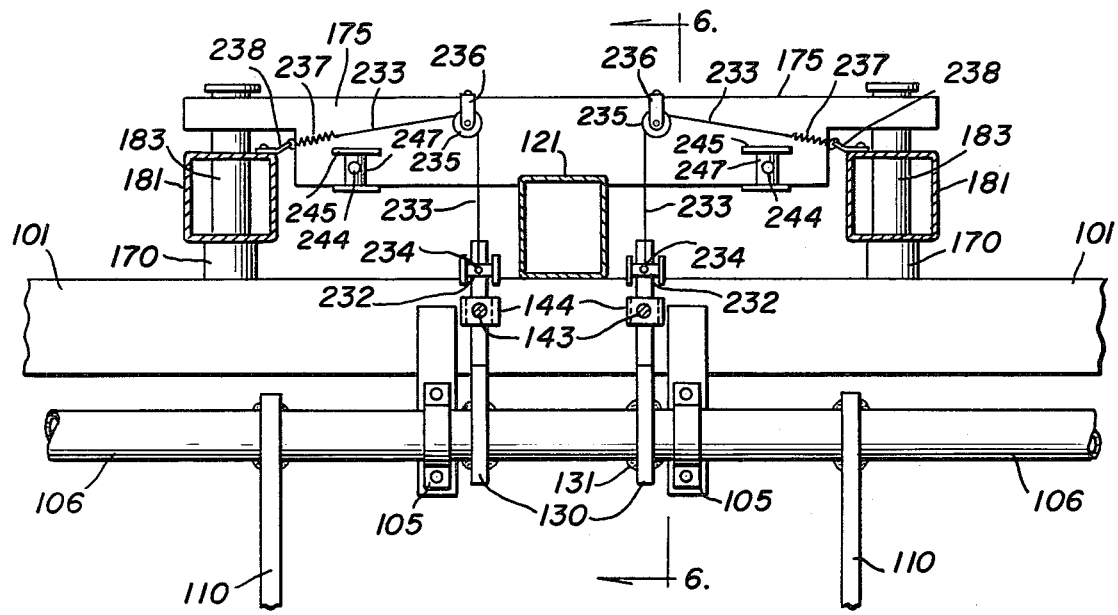
FIG. 5 is an enlarged fragmentary view in vertical section along the line 5—5 of FIG. 1.

The implement frame 100 is preferably drawn by a tractor or draft vehicle (not shown) carrying the usual three-point hitch 55 that provides a draft connection and which also can be used to elevate the connected portion of the implement frame 100. The support frame 101 (see FIGS. 5 and 6 also) is formed as a hollow box and extends transversely of the implement frame 100. Mounted on the lower portion of the support frame 101 are spaced apart bearing members 105 extending slightly forwardly and pivotally supporting a transversely extending wheel mount member 106. The wheel mount member 106 has four struts 110 extending rearwardly and downwardly therefrom, each of the struts 110 carrying an axle 111 on which is mounted one of the support wheels 115. The four wheels 115 support the frame 101 upon an underlying support surface such as a field or highway at all times.

The main frame 120 extends longitudinally and normal to the support frame 101 and includes the two telescoping frame members 121 and 125, the outer frame member 121 being hollow and of rectangular cross section (see FIGS. 7 and 8 also) and telescopically receiving therein the inner longitudinal frame member 125 that is also hollow and of rectangular cross section. The frame member 121 more specifically includes a bottom wall 122 from which extend upwardly side walls 123, the upper edges of the side walls 123 being closed by a top wall 124. The inner frame member 125 also includes a bottom wall 126, two upstanding side walls 127 and a top wall 128.

In order to raise and lower the support frame 101 and the adjacent end of the main frame 120, mechanism is provided to change the inclination of the struts 110 with respect to the longitudinal axis of the main frame 120. To this end, two spaced-apart levers 130 are provided (see FIG. 5 particularly) that are welded to the wheel mount member 106. Two support frame lift cylinders 140 are provided (see FIG. 6 particularly), each including the usual hydraulic cylinder 141, a piston (not shown) and a piston rod 143. Mounted on the bottom of the main frame member 121 is a bracket 139 to which one end of each of the hydraulic cylinders 141 is secured by means of connectors 142. Each of the piston rods 143 carries a connector 144 thereon which is pivotally connected by pivot pins 145 to one of the levers 130.

Figure 7:
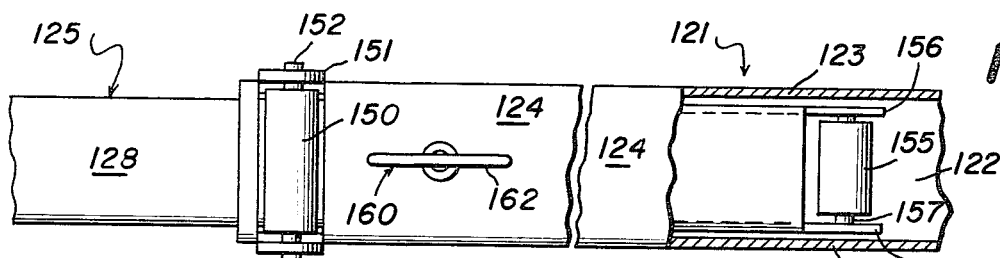
FIG. 7 is a fragmentary plan view with certain parts broken away showing the junction between the two telescoping members forming the main frame for the foldable implement frame and hitch of FIG. 1.
Figure 8:
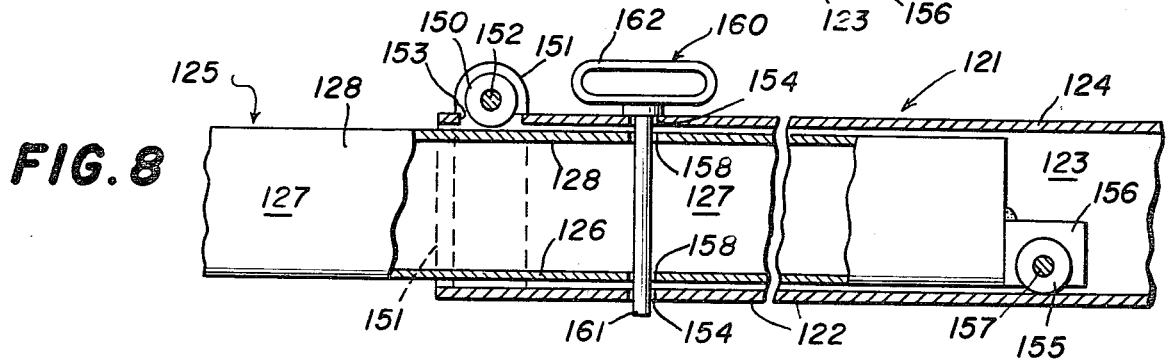
FIG. 8 is a side view with certain portions broken away of the parts illustrated in FIG. 7.

In order to facilitate the telescopic movement between the main frame members 121 and 125, support rollers 150 and 155 have been provided thereon (see FIGS. 7 and 8 particularly). The support roller 150 is mounted on the main frame member 121 by means of two straps 151 secured as by welding to the side walls 123, the straps 151 extending upwardly beyond the top wall 124 and supporting therebetween an axle 152 that in turn rotatably supports the roller 150 thereon. An opening 153 is provided in the top wall 124 so that the roller 150 can extend therethrough and contact the upper surface of the top wall 128 on the frame member 125. Th support roller 155 is mounted upon extensions 156 secured to the rear end of the main frame member 125, the extensions 156 carrying therebetween an axle 157 upon which the support roller 155 is mounted. The roller 155 contacts the inner surface of the bottom wall 121. The support rollers 150 and 155 combine to insure that there is easy sliding of the main frame members 121 and 125 with respect to each other with no binding therebetween. When the implement frame 100 is in the working position thereof illustrated in FIG. 2, the telescoping main frame members 121 and 125 are in the positions illustrated in FIGS. 7 and 8. With the parts in this position, vertically aligned openings 154 through the bottom wall 121 and the top wall 124 of the outer frame member 121 are in alignment with openings 158 in the bottom wall 126 and the top wall 128 of the inner frame member 125. There is provided a pin generally designated by the numeral 160 including a shaft 161 and a handle 162 that serves to hold the frame members 121 and 125 in this telescoped position, the shaft 161 extending through the aligned openings 154 and 158.

The other end of the inner frame member 125 is provided with a bifurcated hitch 165 offset downwardly with respect to the main frame member 125 and is secured to the three-point hitch 55 of the associated tractor by a pin 166, see FIGS. 1 and 4. This connection of the main frame member 120 to the hitch 55 not only provides the necessary draft connection for the foldable implement frame and hitch 100, but also provides the connection so that the three-point hitch 55 can be used to elevate the forward end of the implement frame 100, the rear end of the implement frame 100 and specifically the rear end of the main frame 120 being raised with respect to the ground by operation of the lift cylinders 140 described heretofore, the lift cylinders 140 acting between the main frame 120 and the wheel support member 106.

The wings 180 are pivotally secured to the support frame 101, and to this end, the support frame 101 carries two bearings 170 on the upper surface thereof spaced inwardly from the ends thereof. Each wing 180 includes a hinge member 181 that is secured to a hinge pin 183 extending upwardly from one of the bearings 170, each of the hinge members 181 being mounted for pivotal movement about a generally vertical axis. The outer end of each of the hinge members 181 carries a vertically oriented connector 185 which has secured between the lower ends thereof one end of the associated wing frame 190. A pivot pin 186 pivotally interconnects the vertical connector 185 and the associated wing frame 190 so as to provide for pivotal movement of the wing frame 190 about a generally horizontal axis defined by the pivot pin 186. The wing frames 190 are hollow and box shape in cross section (see FIG. 11) and are movable between an extended working position illustrated in FIG. 2 and a folded transport position illustrated in FIG. 1.

Because of the substantial length of each of the wing frames 190, the outer end thereof is supported by a wing wheel assembly 200 (see particularly FIGS. 1, 2 and 3). Each of the wing wheel assemblies 200 includes a bracket 201 mounted on the associated wing frame member 190 and fixedly secured thereto as by welding, the brackets 201 extending rearwardly from the associated wing frame 190. A pivot 202 is carried by the brackets 201, each of the pivots 202 supporting a pair of struts 206 that carry an axle 207 upon which is rotatably mounted a wheel 208. The wheels 208 support the outer ends of the associated wing frames 190 during the movement of the parts between the working position thereof and the transport position thereof and also whenever it is desired to lift the implement carried by the implement frame 100 out of contact with the underlying soil.

In order to move the wheel 208 between the support position and the retracted working position, wheel lift motors 210 have been provided. Each of the motors 210 includes a cylinder 211 provided with a piston (not shown) connected to a piston rod 212 that extends out of one end of the cylinder 211. The other end of the piston rod 212 carries a connector 213 that is secured to the wing frame 190. The hydraulic cylinder 211 is pivotally secured by a pivot pin 217 to two lever arms 216 disposed on the opposite sides of the cylinder 211.

To assist in holding the wings 180 in the fully extended and working positions illustrated in FIG. 2, each of the wings 180 has been provided with a wing brace generally designated by the numeral 220. One end of each of the wing braces 220 is pivotally secured to a bracket 221 by means of a pivot pin 222, each bracket 221 being fixedly secured to one of the wing frames 190 at a position such that the effective pivot connection between the wing brace 220 and the wing frame 190 is essentially at the midpoint of the wing frame 190 (i.e., the point of intersection of an extension of the wing brace 220 with the wing frame 190 as viewed in FIG. 2). The other end of each of the wing braces 220 is pivotally secured by a pivot pin 226 to the stabilizer lock 250 to be described more fully hereinafter.

Figure 6:
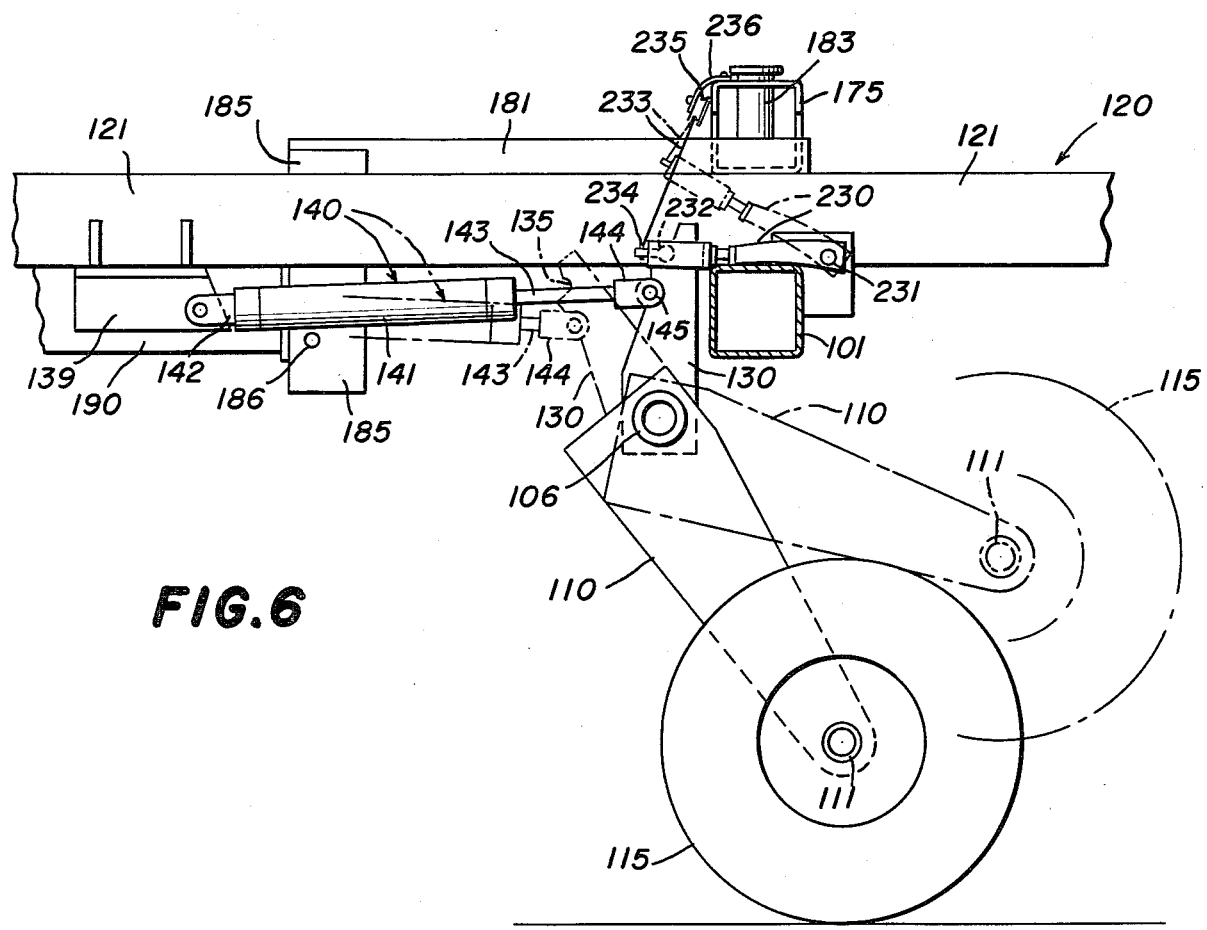
FIG. 6 is a view in vertical section along the line 6—6 of FIG. 5.

During the transport of the implement frame 100 with the parts in the position illustrated in FIG. 1, the struts 110 are in the solid line positions of FIG. 6 which serves to hold the support frame 101 and the adjacent end of the main frame 120 in the elevated positions necessary for transport. In order to insure that the struts 110 remain in the designated transport positions during transport of the implement frame 100, two latch mechanisms 225 have been provided. Each of the latch mechanisms includes a lever arm 230, the length of which can be adjusted, having one end pivoted as at 231 on an extension from the support frame 101. The outer end of each of the lever arms 230 carries a transversely disposed keeper 232 to which is attached a cable 233 by means of an attachment member 234. The cable 233 passes upwardly and rearwardly around a pulley 235 supported by a bracket 236 on the cross member 175. The cable 233 continues around the pulley 235 and is secured to one end of a spring 237, the other end of the spring 237 being fixedly secured by a bracket 238 to one of the hinge members 181. When the associated hinge member 181 is in the fully folded position illustrated in FIG. 5 and by solid lines in FIG. 6, the bracket 238 is moved inwardly toward the main frame member 121 so as to permit the keeper 232 to be lowered so as to engage in a latch notch 135 disposed in the associated lever 130. Since the lever 130 is fixedly attached to the wheel mount member 106 that carries the struts 110, engagement of the latch mechanism 225 securely holds the parts with the struts 110 in the elevating solid line positions of FIGS. 5 and 6. When the wing hinge members 181 are pivoted outwardly to place the wings 180 in the extended working positions illustrated in FIG. 2, the cables 233 are pulled outwardly as viewed in FIG. 5 so as to raise the lever arms 230 and to disengage the keepers 232 from the latch notches 135 in the levers 130. This then permits the struts 110 to move from the solid line positions in FIG. 6 to the dashed line positions therein under the urging of the hydraulic motors 140.

In order to assist in the following of the wings 180 between the retracted travel positions illustrated in FIG. 1 and the extended working positions illustrated in FIG. 2, two wing folding motors 240 have been provided. Each of the motors 240 includes the usual hydraulic cylinder 241 having a piston (not shown) disposed therein and connected to a piston rod 244 extending from one end of the cylinder 241. The other end of each of the cylinders 241 is connected to the vertical connector 185 of the associated wing 180 by a coupling 242 and a pin 243. The piston rods 244 are respectively connected to brackets 245 on the support frame 101 by means of pins 247. Contraction of the motors 240 assists in moving the wings 180 from the extended working positions of FIG. 2 toward the folded positions of FIG. 1.

Figure 9:
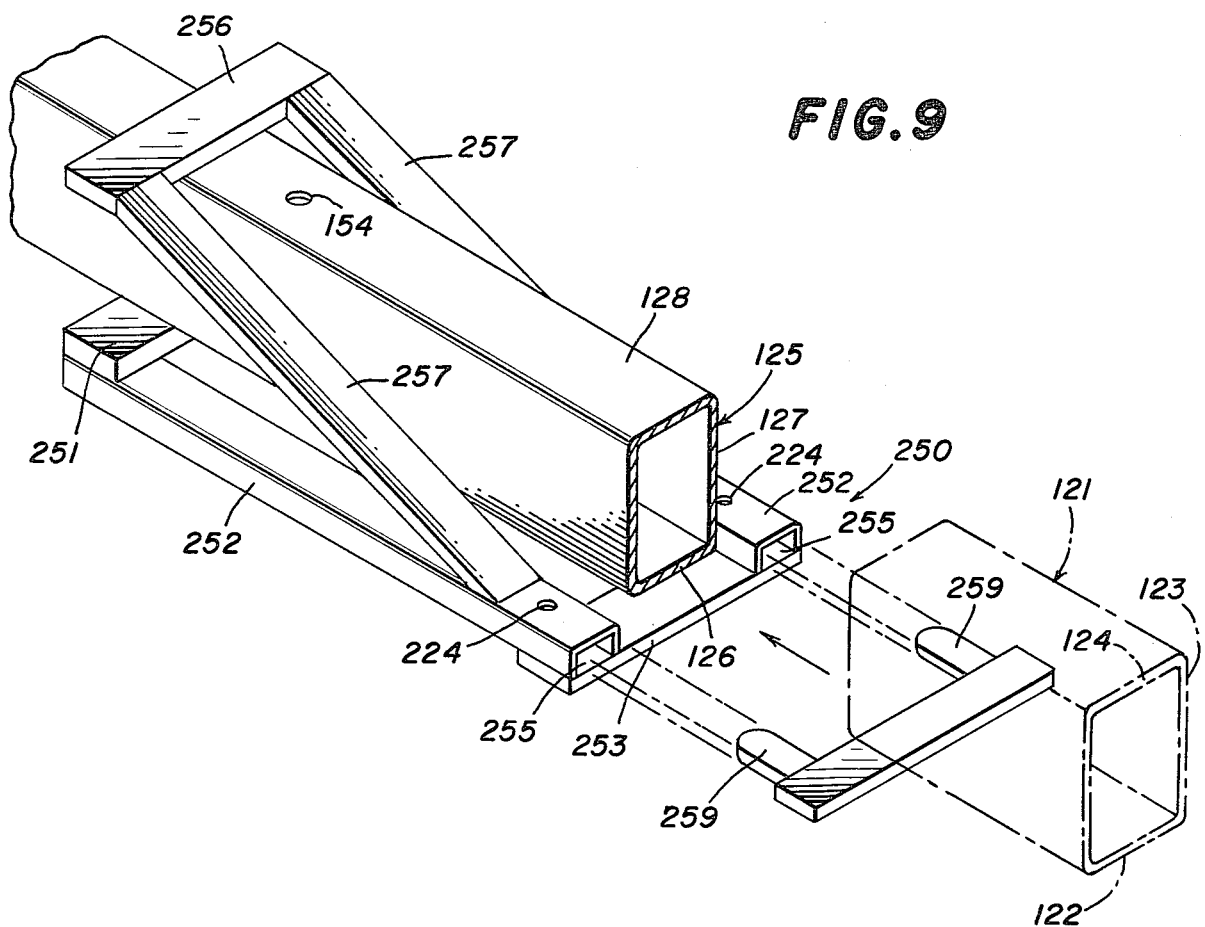
FIG. 9 is an enlarged perspective view with certain parts broken away illustrating the stabilizing lock for the two telescoping frame members when the foldable implement frame and hitch is in the working position thereof.

When the main frame members 121 and 125 are in the fully telescoped and working positions thereof, it is desired to stabilize the same and to provide for transmission of draft forces therebetween through structure in addition to the lock pin 160. To this end the stabilizer lock 250 has been provided and is best illustrated in FIGS. 2 and 9. The stabilizer lock 250 includes a bottom cross bar 251 fixedly secured to the bottom wall 126 of the frame member 125 and extending laterally beyond the side walls 127 thereof. Disposed below and secured to the cross bar 251 are two rearwardly extending channels 252 that are open at the bottom and open at the rear end. A plate 253 interconnects the rear ends of the channels 252 and also closes the bottoms of the rear ends thereof to provide two laterally spaced-apart openings or receptacles 255. Since the channels 252 extend in cantilever relation with respect to the cross bar 251, two braces 257 are provided connected at one end to the rear portions of the channels 252 and at the other end to a top cross bar 256 welded to the top wall 128 of the main frame member 125. Mounted on the bottom wall 122 of the outer frame member 121 is a cross bar 258 that extends beyond the side walls 123 thereof and carries on the underside forwardly extending tongues 259. When the main frame members 121 and 125 arrive at the fully telescoped operating positions as illustrated in FIG. 2, the tongues 259 enter into the recesses 255 to provide vertical and lateral stability for the juncture while the forward end of the frame member 121 passes over the plate 253 to be supported thereby. The cross bars 251 and 256 serve to anchor the channels 252 and the braces 257. The presence of the tongues 259 on the cross bar 258 in the openings 255 prevents the wing frames 190 from putting stress on the channels 252 and the braces 257. The lefthand and righthand wing frames 190 do not tend to move in opposition to each other, but in unison creating a stress situation on the channels 252 and the braces 257 due to the distance away from the cross bars 251 and 256. The channels 252 cooperating with the braces 257 give greater strength for the clearance to brace the wing braces 220 during a turn to the right or a turn to the left. It also is pointed out that the pivot pins 226 on the braces 220 are secured to the stabilizer lock structure 250.

Figure 10:
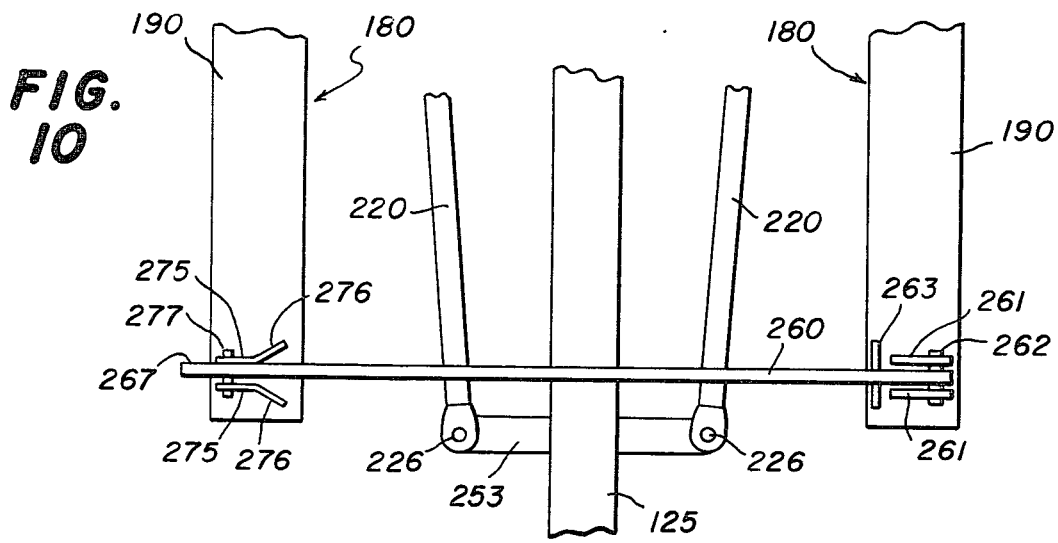
FIG. 10 is a fragmentary plan view illustrating the transport link that locks the wings of the folded implement frame and hitch in the folded transport positions thereof.
Figure 11:
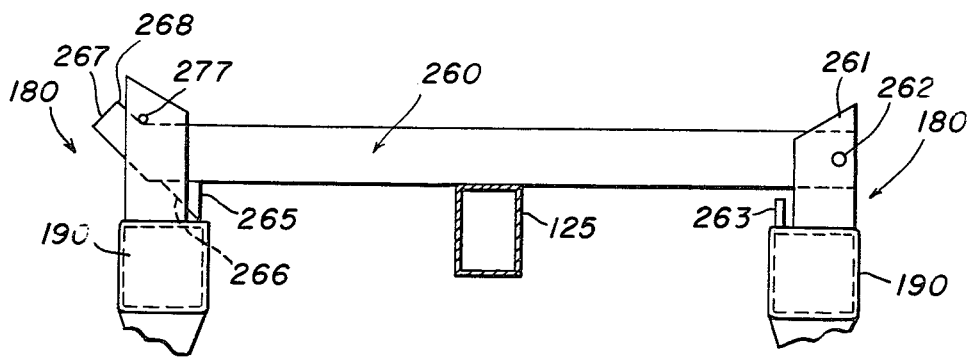
FIG. 11 is a fragmentary front elevational view of the foldable implement frame and hitch with the parts in the folded transport positions thereof.

When the implement frame 100 is in the folded transport position illustrated in FIG. 1, it is desirable to lock the wings 180 on the main frame 120, this structure being best illustrated in FIGS. 1, 10 and 11. There is provided a transport link 260 that is pivotally secured at one end thereof between two brackets 261 by means of a pivot pin 262. The other end of the transport frame 260 carries on the under side thereof a ramp 265 having a cam surface 266 on the lower surface thereof and at the end thereof an upwardly extending retainer 267 having an abutment surface 268 that is inclined upwardly and outwardly. The wing frame 190 disposed to the left as viewed in FIG. 11 carries two upstanding flanges 275 having the inwardly facing surfaces thereof flared as at 276, the flared flanges 275 are adapted to receive therebetween the retainer 267 on the transport link 260. A pin 277 is fixedly secured between the flanges 275 and is adapted to be engaged by the abutment surface 268 when the parts are placed in the position illustrated in FIG. 11.

As the wings 180 move from the positions illustrated in FIG. 2 to that illustrated in FIG. 1, the transport link 260 is in a down or essentially horizontal position that slightly declines downwardly and is held in that position by a stop 263. As the two wing frames 190 approach each other, the cam surface 266 on the lower ramp 265 is contacted by the adjacent edge of the approaching wing frame 190 and is cammed upwardly and then as the wing frames 190 continue to move toward each other, the retainer 267 passes under the pin 277. To place the implement frame 100 in the transport position, the operator actuates the three-point hitch 55 thus lifting the main frame member 125 against the underside of the transport link 290 and in this manner also lifts the wing frames 190 and the attached parts. This transmittal of the weight of the wing frames 190 and the attached parts to the transport link 260 further serves to lock the transport link 260 in the wing retaining positions of FIGS. 10 and 11.

Figure 12:
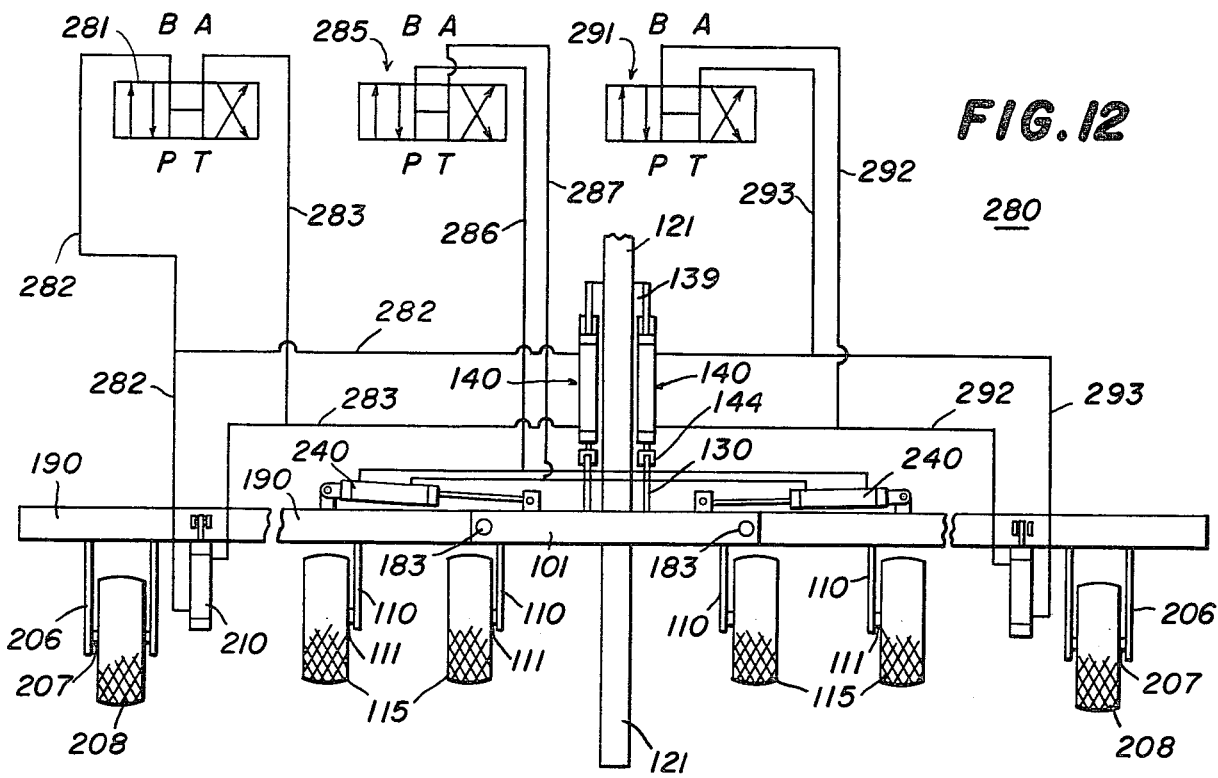
FIG. 12 is a schematic diagram of the hydraulic system for the various hydraulic motors forming a part of the foldable implement frame and hitch.

Referring to FIG. 12 of the drawings, there is illustrated the hydraulic circuit 280 for controlling the various hydraulic motors 140, 210 and 240. A first control valve 281 is provided for controlling the "left" ones of the hydraulic motors 140 and 210 as viewed in FIG. 12. As illustrated, the valve 281 is an open-center valve, but it will be appreciated that a closed-center valve may be used as well. One of the pressure lines 282 from the valve 281 is connected both to the "left" motor 140 and to the "left" motor 210 at the ends thereof to cause extension of the piston rods therefrom. The other line from the valve 281 is designated 283 and is connected to the others ends of the hydraulic motors 140 and 210 on the left in FIG. 12.

A second control valve 291 like the control valve 281 described above has been provided for controlling the "right" hydraulic motors 140 and 210 as viewed in FIG. 12. One of the lines 292 from the control valve 291 is connected to one end of the "right" motors 140 and 210 to effect expansion or extension of the piston rods therein when pressure is applied through the lines 291, and the other line 293 from the control valve 291 is connected to the other end of the "right" hydraulic motors 140 and 210.

From this arrangement, it will be appreciated that actuation of the valve 281 serves to actuate both the "left" hydraulic motor 140 tending to raise and lower the rear end of the frame 100 and the "left" hydraulic motor 210 raising and lowering the winged wheel assembly 200 connected thereto, and also disengaging and engaging the associated mechanism such as a planter 60 mounted on the frame 100. Likewise, actuation of the control valve 291 simultaneously actuates the "right" hydraulic motor 140 tending to raise and lower the rear end of the frame 100 and actuates the "right" hydraulic motor 210 that raises and lowers the "right" wing wheel assembly 200 and simultaneously disengaging and engaging mechanism such as a corn planter 60 mounted thereon. The force generated by a single one of the hydraulic motors 140 is insufficient to lift the rear end of the frame 100, the simultaneous actuation of valves 281 and 291 being necessary so as simultaneously to actuate both hydraulic motors 140 if the rear end of the frame 100 is to be lifted. As a consequence, actuation of the control valve 281 without actuation of the control valve 291 serves only to raise and lower the "left" wing wheel assembly 200, and likewise actuation of the control valve 291 without actuation of the control valve 281 serves only to raise and lower the "right" wing wheel assembly 200.

The wing folding motors 240 are actuated by a control valve 285 that may be of the same construction as the control valves 281 and 291 described above. Both the motors 240 are connected to the same hydraulic lines, one end of the cylinders of the motors 240 being connected to line 286 and the other end being connected to the line 287.

The manner of use and operation of the implement frame 100 will now be described in detail. Starting with the parts in the fully retracted and folded position of FIG. 1 which is the transport position for the implement frame 100, the various parts will be disposed as follows: the three-point hitch 55 will be raised, thus raising the main frame member 125 and the parts associated therewith so as to provide ground clearance. The wings 180 are in the fully folded position whereby the wing frames 190 are disposed essentially parallel and forwardly extending and the transport link 260 is in the locking position illustrated in FIG. 11. The hydraulic motors 140 are extended so as to raise the rear of the main frame 120 and the support frame 101 as illustrated in FIG. 4. The pin 160 has been removed.

In order to move the parts of the implement frame 100 from the positions illustrated in FIG. 1 to those illustrated in FIG. 2, the three-point hitch 55 is lowered so as to rest the wing frames 190 upon the wheels 208 and to lower the main frame member 125 out of contact with and spaced below the transport link 260. The operator then drives the associated tractor slowly rearwardly. The support frame 101 on the wheels 115 remains essentially stationary while the inner frame member 125 is pushed rearwardly with respect to the outer frame member 212. This action transmits a force to the braces 220 that tends to move the wing frames 190 apart and away from each other toward the positions illustrated in FIG. 2. The hydraulic motors 240 are also extended at this time by actuating the control valve 285 thus to aid in this rearward swinging of the wing frames 190.

The parts eventually arrive at the positions illustrated in FIG. 2, i.e., with the wing frames 190 in lateral alignment, the hydraulic motors 240 fully extended and the main frame members 121 and 125 fully telescoped and with the openings 154 and 158 in alignment. The operator must now leave his seat on the tractor so that he may place the pin 160 through the aligned openings 154–158 (see FIG. 8). The pin 160 holds the main frame members 121 and 125 in the fully telescoped and coupled position illustrated in FIG. 2. It will also be noted that as the main frame members 121 and 125 approach the fully telescoped positions thereof, the tongues 259 enter the openings 255 (see FIG. 9) to impart rigidity to the main frame at this juncture. The latch mechanisms 255 are disengaged, i.e., the keepers 232 are removed from the latch notches 135 on the levers 130.

The operator then resumes his seat on the tractor and simultaneously actuates the control valves 281 and 291 to operate the hydraulic motors 140 to the retracted positions so as to lower the support frame 101 and the rear end of the main frame 120 to the working positions thereof. The hydraulic motors 140 and the hydraulic motors 210 are connected to the same hydraulic circuit, whereby actuation of the control valves 281 and 291 to lower the support frame 101 and the main frame 120 by retracting the motors 140 simultaneously retracts the motors 210 to raise the wheels 208 to the working positions thereof.

Certain implements carried by the implement frame 100 further include clutch arrangements which are also actuated by the shifting of the wheels 208, whereby placing the wheels 208 in the working position engages the implement clutches, while movement of the wheels 208 to the transport position disengages the implement clutches. The implement frame and the implements thereon are now in the position for working and the associated tractor moves forwardly pulling the implement frame 100 behind.

When it is desired to transport the implement frame 100, it can be moved from the working position illustrated in FIG. 2 to the transport position illustrated in FIG. 1 as follows: the operator gets down from the seat of the associated tractor and removes the pin 160. He then remounts the tractor and actuates the control valves 281 and 291 to expand the hydraulic motors 140 and 210 to raise the support frame 101 and the frame member 121 to the positions of FIG. 4 and also to raise the outer end of the wing frames 190 by moving the wheels 208 to a position to raise the wing frames 190. The operator then starts the tractor forward at a slow rate while simultaneously actuating the control valve 285 to operate the wing folding motors 240 to contract the same. The inner frame member 125 moves forwardly as the tractor moves to the left in FIG. 2, the braces 220 being connected to the inner frame member 125 serving to pull the wings 180 forward. The outer ends of the wing frames 190 are supported by the wheels 208 whereby the parts move to the position of FIG. 1. As the outer ends of the wings 180, and specifically the wing frames 190, approach each other, the cam surface 266 on the ramp 265 of the transport link 260 (which is in the lowered position) strikes the opposing wing frame 190 to lift the transport link 260 while the retainer 267 passes under the pin 277 to place the abutment surface 268 to the left beyond the pin 277 as viewed in FIGS. 10 and 11, the flared portions 276 of the flanges 275 guiding the retainer 267 therebetween. The three-point hitch is raised so as to lift the adjacent end of the main frame 120. The inner frame member 125 is raised against the transport link 260 and through the transport link 260 raises the outer ends of the wing frames 190. As the wings 180 approach the fully folded position of FIGS. 10 and 11, the levers 130 are in the solid line positions illustrated in FIGS. 5 and 6, whereby when the wings 180 reach the fully folded position, the hinge members 181 will be in the positions illustrated in FIGS. 5 and 6, whereby the cables 233 will permit the latch mechanisms to engage, i.e., the keepers 232 are seated in the latch notches 135 on the associated levers 130, thus to maintain the struts 110 in the raised positions illustrated by solid lines in FIG. 6.

In one illustrative example of the implement frame 100 of the present invention, the frame 100 is particularly adapted to carry 12 air-injection plate lift planter units 60 so as to plant simultaneously 12 rows of hard kernel grains such as corn or soybeans with 30 inch spacing between rows. In that implement frame 100, when the implement frame is in the working position illustrated in FIG. 2, the distance from the end of one of the wings 180 to the end of the other wing 180 is 30 feet 6 inches, each of the wings 180 has a length from the hinge pin 183 to the end thereof of 13 feet 1 inch, the distance between hinge pins 183 is 4 feet 4 inches, the length of the wing braces 220 is 8 feet 3 inches, the distance between the hinge pin 183 and the adjacent pivot pin 222 is 5 feet 3 inches, the distance that the outer frame member 121 extends behind the support frame 101 is 4 feet 3 inches, the distance between the pin 166 and the pivot pin 226 is 5 feet 3 inches, the distance between the pin 166 and the support frame 101 when the parts are in the working positions illustrated in FIG. 2 is 11 feet and the distance between the pin 166 and the support frame 101 when the parts are in the transport positions of FIG. 1 is 18 feet 6 inches. The ratio between the distance between the pin 166 and the support frame 101 when the parts are in the working positions of FIG. 2 and the distance between the hinge pin 183 and the outer end of the associated wing 180 is about 0.84, while the ratio between the distance that the outer frame member 121 extends behind the support frame 101 and the distance between the hinge pin 183 and the outer end of the associated wing 180 is about 0.33.

In another illustrative example of the implement frame 100 of the present invention, the frame 100 is particularly adapted to carry 16 air-injection plate lift planter units 60 so as to plant simultaneously 16 rows of hard kernel grain such as corn or soybeans with 30 inch spacing between rows. In that implement frame 100, when the implement frame is in the working position illustrated in FIG. 2, the distance from the end of one of the wings 180 to the end of the other wing 180 is 41 feet 8 inches, each of the wings 180 has a length from the hinge pin 183 to the end thereof of 18 feet 8 inches, the distance between hinge pins 183 is 4 feet 4 inches, the length of the wing braces is 11 feet 3 inches, the distance between the hinge pin 183 and the adjacent pivot pin 222 is 8 feet, the distance that the outer frame member 121 extends behind the support frame 101 is 6 feet, the distance between the pin 166 and the pivot pin 226 is 5 feet 3 inches, the distance between the pin 166 and the support frame 101 when the parts are in the working positions illustrated in FIG. 2 is 12 feet and the distance between the pin 166 and the support frame 101 when the parts are in the transport positions of FIG. 1 is 24 feet 3 inches. The ratio between the distance between the pin 166 and the support frame 101 when the parts are in the working positions of FIG. 2 and the distance between the hinge pin 183 and the outer end of the associated wing 180 is about 0.64, while the ratio between the distance that the outer frame member 121 extends behind the support frame 101 and the distance between the hinge pin 183 and the outer end of the associated wing 180 is about 0.32.

In yet another illustrative example of the implement frame 100 of the present invention, the frame 100 is particularly adapted to carry 24 air-injection plate lift planter units 60 so as to plant simultaneously 24 rows of hard kernel grain such as corn or soybeans with 30 inch spacing between rows. In that implement frame 100, when the implement frame is in the working position illustrated in FIG. 2, the distance from the end of one of the wings 180 to the end of the other wings 180 is 62 feet, each of the wings 180 has a length from the hinge pin 183 to the end thereof of 28 feet 10 inches, the distance between hinge pins 183 is 4 feet 4 inches, the length of the wing braces 220 is 17 feet 3 inches, the distance between the hinge pin 183 and the adjacent pivot pin 222 is 11 feet 9 inches, the distance that the outer frame member 121 extends behind the support frame 101 is 5 feet 9 inches, the distance between the pin 166 and the pivot pin 226 is 5 feet 3 inches, the distance between the pin 166 and the support frame 101 when the parts are in the working positions illustrated in FIG. 2 is 18 feet and the distance between the pin 166 and the support frame 101 when the parts are in the transport positions of FIG. 1 is 34 feet 3 inches. The ratio between the distance between the pin 166 and the support frame 101 when the parts are in the working positions of FIG. 2 and the distance between the hinge pin 183 and the outer end of the associated wing 180 is about 0.62, while the ratio between the distance that the outer frame member 121 extends behind the support frame 101 and the distance between the hinge pin 183 and the outer end of the associated wing 180 is about 0.20.

A large number of implements may be advantageously mounted upon the implement frames 100 described above in place of the air-injection plate lift planters described. Other examples of tools that may be mounted upon the frames 100 are rotary hoes and "duck-foot" field cultivators. When folded to the transport position of FIG. 1, each of the implement frames 100 described above has a transport width of only 11 feet with no implements mounted thereon and has a transport width of only 15 feet when there are mounted thereon air-injection plate lift planters 60 as illustrated in the drawings.

An important feature of the present invention resides in the fact that the outer frame member 121 extends a substantial distance behind the support frame 101. This moves the associated tractor nearer to the support frame 101 and the wings 180 carrying the implements so as to provide a short coupling therebetween. The short coupling provides good control by the operator using the tractor over the implement frame 100 and provides an improved maneuverability. There further is less tendency for the implement frame 100 to drift when operating on a hillside. Placement of the outer frame member 121 on top of the support frame 101 also enhances the construction of the implement frame 100 by insuring adequate clearance for all of the parts involved. In addition, every foot that the outer frame member 121 extends rearwardly with respect to the support frame 101 provides an additional one foot that the telescoping frame members 121 and 125 can move outwardly.

When the parts are in the transport position illustrated in FIG. 1, it is desired that there be at least a three foot overlap of the outer frame member 121 and the inner frame member 125. The distance that the frame members 121 and 125 can telescope is determined by the sum of the distance between the hinge pin 183 and the brace pivot 221 plus the length of the brace 220 less the distance between the hinge pin 183 and the pivot 226 when the parts are in the working positions of FIG. 2. The rearward extension of the outer frame member 121 behind the support frame 101 can be expressed as a fraction of the distance between the hinge pin 183 and the outer end of the associated wing 180, that ratio being 0.33, 0.32 and 0.20 for the three examples of implement frames 100 described above. It has been found that this ratio should be at least about 0.2 to provide the close coupling between the tractor and the implement frame 100 in the working position thereof while still providing adequate extension to move all the parts to the transport positions thereof.

The close coupling between the tractor and the support frame 101 and the wings 180 can also be expressed by a ratio between the distance between the pin 166 and the support frame 101 when the parts are in the working positions of FIG. 2 and the distance between the pin 166 and the support frame 101 when the parts are in the transport positions of FIG. 1. In the three exemplars of the implement frame 100 given above, these ratios were 0.84, 0.64 and 0.62. It has been found that this ratio should be in the range from about 0.6 to about 0.9 in order to give the desired close coupling between the tractor and the implements mounted upon the support frame 101 and the wings 180. This short coupling together with the alignment of all the wheels 115 and 208 in essentially lateral alignment provides for a minimum turning radius for the implement frame 100.

From the above description, it will be understood that the implement frame 100 can be moved between the working position of FIG. 2 and the transport position of FIG. 1 without unhitching the tractor therefrom, and without moving to a different hitch point upon the implement frame 100. No additional equipment is needed for transport, and specifically no trailer or additional wheels are required; in other words, the implement frame 100 is completely self-contained. It further is pointed out that it is easy to move the implement frame 100 between the working and transport positions thereof, this movement being accomplished by one man with a minimum of time and effort.

The above proportion among the parts also insures that the outer ends of the wing frames 190 in the folded positions thereof lie alongside and terminate essentially at the forward pivot 226 for the braces 220. This provides a clear space forwardly of the pivots 226 all the way to the hitch pin 166. This assures proper clearance of the tires on an associated tractor while making turns during the use of the implement frame 100.

Finally, it is pointed out that due to the unique hydraulic circuitry illustrated in FIG. 12, it is possible when implements 60 are mounted on the frame 100 to lift one of the wing frames 190 and disengage the implements 60 thereon while continuing working with the other wing frame 190 and the implement 60 thereon. This results from the fact that the "left" hydraulic motors 140 and 210 are in the same hydraulic circuit and are controlled by a single operating lever, while the "right" hydraulic motors 140 and 210 are likewise in the same hydraulic circuit and are controlled by a single operating lever. Both of the hydraulic motors 140 must be actuated simultaneously if the support frame 101 and the attached outer frame member 121 are to be lifted with respect to the ground. As a consequence, if only the "left" hydraulic motors 140 and 210 are actuated, the "left" hydraulic motor 140 will not be effective to raise the main frame 120, but the "left" hydraulic motor 210 will be actuated thereby to move the parts to the raised position, thus to disengage the drive clutch for the implements 60 on the lefthand side of the implement frame 100. As a result, planting or cultivating will proceed only with the implements 60 mounted on the righthand side of the implement frame 100, thus making it possible to plant small odd areas wherein only half of the width of the implements on the frame 100 are desired to be actuated.

The hydraulic circuitry illustrated in FIG. 12 can also be utilized to correct the situation that may be encountered in that the wing frames 190 are not on the same level when the parts approach the fully folded position illustrated in FIG. 11. For example, if the wing frame 190 disposed to the left in FIG. 11 (heretofore referred to as the "right" part of the hitch 100) is too low, the operator would actuate the "left" control valve 281 to lower the "left" wing frame 190 (the wing frame 190 disposed to the right in FIG. 11) until the two wing frames 190 were at the same level. Continued actuation of the control valve 285 with accompanying continued forward motion of the tractor will move the parts to the fully folded position illustrated in FIG. 11.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A foldable implement frame and hitch for attachment to a draft vehicle equipped with a three-point hitch, comprising a support frame carrying a support wheel for supporting said support frame upon an underlying surface, a main frame including two telescoping frame members, the outer one of said frame members being supported upon said support frame and the inner one of said frame members carrying on the other end thereof a hitch for connection to the three-point hitch on a draft vehicle, two wing frames pivotally mounted on the top of said support frame respectively on either side of said outer frame member for movement between extended working positions wherein said wings are in vertical alignment with said support frame and retracted transport positions, and two wing motors connected respectively between said outer frame member and the associated one of said wing frames for moving said wing frames between the extended working positions and the retracted transport positions, the inner one of said frame members extending a substantial distance beyond said support frame in a direction away from said hitch so that upon operation of said wing motors and the telescoping of said frame members to place said wing frames in the extended working positions thereof the associated draft vehicle is disposed only a short distance from said wing frames to provide good maneuverability of said implement frame in the field.

2. The foldable implement frame and hitch set forth in claim 1, wherein the outer one of said frame members overlies said support frame.

3. The foldable implement frame and hitch set forth in claim 1, wherein the inner one of said frame members extends beyond said support frame a distance equal to at least about 0.2 parts of the length of one of said wing frames.

4. The foldable implement frame and hitch set forth in claim 1, wherein the associated draft vehicle is disposed a distance from said wing frames that is at least about 0.6 times and no greater than about 0.9 times the length of one of said wing frames.

5. A foldable implement frame and hitch for attachment to a draft vehicle equipped with a three-point hitch, comprising a support frame carrying a support wheel for supporting said support frame upon an underlying surface, a main frame including two telescoping frame members, the outer one of said frame members being supported upon said support frame and the inner one of said frame members carrying on the other end thereof a hitch for connection to the three-point hitch on a draft vehicle, two wing frames pivotally mounted on said support frame respectively on either side of said outer frame member for movement between extended working positions and retracted transport positions, two braces pivotally connected respectively to said inner frame member and the associated one of said wing frames, said braces being connected to said inner frame member a distance from said hitch sufficient to accommodate a wheel of the draft vehicle to permit the draft vehicle to face parallel to said wing frames in the extended working positions thereof without contacting the adjacent one of said braces thereby to shorten the turning radius of said implement frame, and two wing motors connected respectively between said outer frame member and the associated one of said wing frames for moving said wing frames between the extended working positions and the retracted transport positions.

6. The foldable implement frame and hitch set forth in claim 5, wherein the effective pivot point between each of said braces and the associated wing frame is essentially at the longitudinal midpoint of the associated wing frame.

7. A foldable implement frame and hitch for attachment to a draft vehicle equipped with a three-point hitch, comprising a support frame carrying a support wheel for supporting said support frame upon an underlying surface, a main frame including two telescoping frame members, the outer one of said frame members being supported upon said support frame and the inner one of said frame members carrying on the other end thereof a hitch for connection to the three-point hitch on a draft vehicle, two wing frames pivotally mounted on the top of said support frame respectively on either side of said outer frame member for movement between extended working positions wherein said wings are in vertical alignment with said support frame and retracted transport positions, two wing wheel assemblies respectively mounted on said wing frames adjacent to the outer ends thereof and each including a support wheel for supporting the outer end of the associated wing frame upon an underlying surface, and two wing motors connected respectively between said outer frame member and the associated one of said wing frames for moving said wing frames between the extended working positions and the retracted transport positions, the inner one of said frame members extending a substantial distance beyond said support frame in a direction away from said hitch so that upon operation of said wing motors and the telescoping of said frame members to place said wing frames in the extended working positions thereof the associated draft vehicle is disposed only a short distance from said wing frames to provide good maneuverability of said implement frame in the field.

8. The foldable implement frame and hitch set forth in claim 7, wherein each wing frame includes a hinge member pivotally mounted on said support frame for pivoting about an essentially vertical axis and an outer member pivotally connected to said hinge member for pivoting about an essentially horizontal axis to accommodate limited vertical movement of said outer member with respect to said support frame.

9. A foldable implement frame and hitch for attachment to a draft vehicle equipped with a three-point hitch, comprising a support frame carrying a support wheel for supporting said support frame upon an underlying surface, a main frame including two telescoping main frame members, the outer one of said frame members being supported adjacent to one end thereof upon said support frame and the inner one of said frame members carrying on the other end thereof a hitch for connection to the three-point hitch on a draft vehicle, two wing frames pivotally mounted on the top of said support frame respectively on either side of said outer frame member for movement between extended working positions wherein said wings are in vertical alignment with said support frame and retracted transport positions, two wing motors connected respectively between said outer frame member and the associated one of said wing frames for moving said wing frames between the extended working positions and the retracted transport positions, two wing wheel assemblies respectively mounted on said wing frames adjacent to the outer ends thereof and each including a support wheel mounted for pivotal movement with respect to the associated wing frame between a lower working position and a higher transport position, and two wing wheel lift motors respectively mounted on said wing frames adjacent to the outer ends thereof for moving the associated support wheel with respect to the associated wing frame between its working position and its transport position, the inner one of said frame members extending a substantial distance beyond said support frame in a direction away from said hitch so that upon operation of said wing motors and the telescoping of said frame members to place said wing frames in the extended working positions thereof the associated draft vehicle is disposed only a short distance from said wing frames to provide good maneuverability of said implement frame in the field.

10. The foldable implement frame and hitch set forth in claim 9, wherein each wing frame includes a hinge member pivotally mounted on said support frame for pivoting about an essentially vertical axis and an outer member pivotally connected to said hinge member for pivoting about an essentially horizontal axis to accommodate limited vertical movement of said outer member with respect to said support frame.

11. A foldable implement frame and hitch for attachment to a draft vehicle equipped with a three-point hitch, comprising a support frame carrying a support wheel for supporting said support frame upon an underlying surface, a main frame including two telescoping frame members, the outer one of said frame members being supported upon said support frame and the inner one of said frame members carrying on the other end thereof a hitch for connection to the three-point hitch on a draft vehicle, two wing frames pivotally mounted on the top of said support frame respectively on either side of said outer frame member for movement between extended working positions wherein said wings are in vertical alignment with said support frame and retracted transport positions, two wing motors connected respectively between said outer frame member and the associated one of said wing frames for assisting in moving said wing frames between the extended working positions thereof and the retracted transport positions thereof, two wing wheel assemblies respectively mounted on said wing frames adjacent to the outer ends thereof and each including a support wheel for supporting the outer end of the associated wing frame upon an underlying surface, and two wing wheel lift motors respectively mounted on said wing frames and connected between the associated wing frame and the associated wing support wheel for moving the associated wing support wheel between a working position and a transport position, the controls for said two wing motors and said wing wheel lift motors all being operable from the draft vehicle whereby an operator can move said wing support wheels between the working positions thereof and the transport positions thereof and can move said wings between the extended working positions thereof and the retracted transport positions thereof all while seated on the draft vehicle, the inner one of said frame members extending a substantial distance beyond said support frame in a direction away from said hitch so that upon operation of said wing motors and the telescoping of said frame members to place said wing frames in the extended working positions thereof the associated draft vehicle is disposed only a short distance from said wing frames to provide good maneuverability of said implement frame in the field.

12. The foldable implement frame and hitch set forth in claim 11, wherein each wing frame includes a hinge member pivotally mounted on said support frame for pivoting about an essentially vertical axis and an outer member pivotally connected to said hinge member for pivoting about an essentially horizontal axis to accommodate limited vertical movement of said outer member with respect to said support frame, said wing motors being connected respectively between said support frame and the associated wing frame hinge member, and said wing wheel assembly being respectively mounted on said wing frame outer members.

13. A foldable implement frame and hitch for attachment to a draft vehicle equipped with a three-point hitch, comprising a support frame carrying a support wheel for supporting said support frame upon an underlying surface, a main frame including two telescoping longitudinal frame members, means interconnecting said support frame and the outer one of said longitudinal frame members and a hitch on the other end of the inner longitudinal frame member for connection to the three-point hitch on a draft vehicle, two wing frames pivotally mounted on said support frame respectively on either side of said outer telescoping frame member for movement between extended working positions and retracted transport positions, said telescoping longitudinal frame members having a telescoping working position placing the associated draft vehicle nearer to said support frame when said wing frames are in the extended working positions thereof, said telescoping longitudinal frame members having an extended transport position placing the associated draft vehicle farther from said support frame to accommodate the folding of said wing frames to the retracted transport positions thereof, and two braces pivotally connected respectively to said inner frame member and the associated one of said wing frames, said braces being connected to said inner frame member a distance from said hitch sufficient to accommodate a wheel of the draft vehicle to permit the draft vehicle to face parallel to said wing frames in the extended working positions thereof without contacting the adjacent one of said braces thereby to shorten the turning radius of said implement frame, and two wing motors connected respectively between said outer frame member and the associated one of said wing frames for moving said wing frames between the extended working positions and the retracted transport positions, the inner one of said frame members extending a substantial distance beyond said support frame in a direction away from said hitch so that upon operation of said wing motors and the telescoping of said frame members to place said wing frames in the extended working positions thereof the associated draft vehicle is disposed only a short distance from said wing frames to provide good maneuverability of said implement frame in the field.

14. The foldable implement frame and hitch set forth in claim 13, wherein the inner one of said telescoping longitudinal frame members has a roller on the end thereof extending into the outer telescoping longitudinal frame member and bearing against the lower wall thereof, and the end of the outer telescoping longitudinal frame member carries a roller engaging the top of the inner telescoping longitudinal frame member.

15. The foldable implement frame and hitch set forth in claim 13, wherein said telescoping longitudinal frame members in the telescoped working positions thereof having aligned openings extending therethrough, and a lock pin extending through said aligned openings to hold the telescoping longitudinal frame members in the telescoped working positions thereof.

16. A foldable implement frame and hitch for attachment to a draft vehicle equipped with a three-point hitch, comprising a support frame carrying a support wheel for supporting said support frame upon an underlying surface, a main frame including two telescoping longitudinal frame members, means interconnecting said support frame and the outer one of said longitudinal frame members and a hitch on the other end of the inner longitudinal frame member for connection to the three-point hitch on a draft vehicle, two wing frames pivotally mounted on said support frame respectively on either side of said outer telescoping frame member for movement between extended working positions and retracted transport positions, said telescoping longitudinal frame members having a telescoped working position placing the associated draft vehicle nearer to said support frame when said wing frames are in the extended working positions thereof said telescoping longitudinal frame members having an extended transport position placing the associated draft vehicle farther from said support frame to accommodate the folding of said wing frames to the retracted transport position thereof, and two braces pivotally connected respectively to said inner frame member and the associated one of said wing frames, said braces being connected to said inner frame member a distance from said hitch sufficient to accommodate a wheel of the draft vehicle to permit the draft vehicle to face parallel to said wing frames in the extended working positions thereof without contacting the adjacent one of said braces thereby to shorten the turning radius of said implement frame, and two wing motors connected respectively between said outer frame member and the associated one of said wing frames for moving said wing frames between the extended working positions and the retracted transport positions, and lock structure engaging and holding said wing frames in the retracted transport position thereof, the inner one of said frame members extending a substantial distance beyond said support frame in a direction away from said hitch so that upon operation of said wing motors and the telescoping of said frame members to place said wing frames in the extended working positions thereof the associated draft vehicle is disposed only a short distance frame said wing frames to provide good maneuverability of said implement frame in the field.

17. The foldable implement frame and hitch set forth in claim 16, wherein said lock structure includes a transport link pivotally mounted on one of said wing frames adjacent to the outer end thereof and a bracket on the other wing frame adjacent to the outer end thereof and engaging and securing said transport link when said wing frames are in the retracted transport positions thereof.

18. A foldable implement frame and hitch for attachment to a draft vehicle equipped with a three-point hitch, comprising a support frame pivotally carrying a support wheel for supporting said support frame upon an underlying surface, a main frame including two telescoping longitudinal frame members, means interconnecting said support frame and the outer one of said longitudinal frame members and a hitch on the other end of the inner longitudinal frame member for connection to a three-point hitch on a draft vehicle, two wing frames pivotally mounted on said support frame respectively on either side of said outer telescoping frame member for movement between extended working positions and retracted transport positions, support wheel lift motor for moving said support wheel with respect to said support frame so as to shift said support frame between a lower working position and a raised transport position, said telescoping longitudinal frame members having a telescoped working position placing the associated draft vehicle nearer to said support frame when said wing frames are in the extended working positions thereof, said telescoping longitudinal frame members having an extended transport position placing the associated draft vehicle farther from the support frame to accommodate the folding of said wing frames to the retracted transport positions thereof, two braces pivotally connected respectively to said inner frame member and the associate one of said wing frames, said braces being connected to said inner frame member a distance from said hitch sufficient to accommodate a wheel of the draft vehicle to permit the draft vehicle to face parallel to said wing frames in the extended working positions thereof without contacting the adjacent one of said braces thereby to shorten the turning radius of said implement frame, and two wing motors connected respectively between said outer frame member and the associated one of said wing frames for moving said wing frames between the extended working positions and the retracted transport positions, and latch mechanism engaging and holding said support wheels in the position thereof corresponding to the raised transport position of said support frame when said wings are in the retracted transport positions thereof, the inner said frame members extending a substantial distance beyond said support frame in a direction away from said hitch so that upon the telescoping of said frame members to place said wing frames in the extended working positions thereof the associated draft vehicle is disposed only a short distance from said wing frames to provide good maneuverability of said implement frame in the field.

19. The foldable implement frame and hitch set forth in claim 18, and further comprising mechanism for said latch mechanism responsive to the movement of said wing frames for releasing said latch mechanism to free said support wheel for movement of said support frame to the lower working position thereof automatically upon movement of said wing frames to the extended working positions thereof and automatically engaging said latch mechanism upon movement of said wing frames to the retracted transport positions thereof.

* * * * *

UNITED STATES PATENT AND TRADEMARK OFFICE
CERTIFICATE OF CORRECTION

PATENT NO. : 4,364,581
DATED : December 21, 1982
INVENTOR(S) : Kenneth E. Shoup

It is certified that error appears in the above–identified patent and that said Letters Patent are hereby corrected as shown below:

Column 19, line 16, "frame" first occurrence should be

--from--.

Signed and Sealed this

Twenty-sixth Day of April 1983

[SEAL]

Attest:

GERALD J. MOSSINGHOFF

Attesting Officer       Commissioner of Patents and Trademarks